US00RE39926E

(19) United States
(12) Reissued Patent
Morimoto et al.

(10) Patent Number: US RE39,926 E
(45) Date of Reissued Patent: Nov. 27, 2007

(54) ARC-MACHINING POWER SUPPLY WITH SWITCHING LOSS REDUCING ELEMENT

(75) Inventors: Keiki Morimoto, Osaka (JP); Toshimitsu Doi, Osaka (JP); Haruhiko Manabe, Osaka (JP)

(73) Assignee: Daihen Corporation, Osaka-shi (JP)

(21) Appl. No.: 11/152,832

(22) Filed: Jun. 14, 2005

Related U.S. Patent Documents

Reissue of:
(64) Patent No.: 6,687,136
Issued: Feb. 3, 2004
Appl. No.: 10/368,102
Filed: Feb. 18, 2003

(30) Foreign Application Priority Data

Feb. 19, 2002 (JP) ..... 2002-040954
Mar. 27, 2002 (JP) ..... 2002-088522

(51) Int. Cl.
*H02M 3/355* (2006.01)

(52) U.S. Cl. ..... 363/17; 363/98; 363/56.03; 363/56.02

(58) Field of Classification Search ..... 363/17, 363/98, 56.02, 56.03
See application file for complete search history.

(56) References Cited

U.S. PATENT DOCUMENTS 5,436,819 A * 7/1995 Mikami et al. ..... 363/41
5,450,306 A * 9/1995 Garces et al. ..... 363/41
6,154,379 A * 11/2000 Okita ..... 363/40
6,222,746 B1 * 4/2001 Kim ..... 363/89
6,256,209 B1 * 7/2001 Gurwicz et al. ..... 363/17
6,423,950 B2 * 7/2002 Moro ..... 219/501
6,538,909 B2 * 3/2003 Goodarzi et al. ..... 363/98
6,556,458 B2 * 4/2003 Ohmura et al. ..... 363/37
6,570,779 B2 * 5/2003 Shimazaki et al. ..... 363/41

* cited by examiner

*Primary Examiner*—Bao Q. Vu
(74) *Attorney, Agent, or Firm*—Hamre, Schumann, Mueller & Larson, PC

(57) ABSTRACT

A power supply for performing arc-machining operation includes a primary rectifier connected to the commercial AC power source and an inverter coupled to the rectifier. A switching device is provided between the rectifier and the inverter. By controlling the power supplied from the rectifier to the inverter, the switching device prevents a large switching loss from occurring in the inverter.

9 Claims, 13 Drawing Sheets

ARC-MACHINING POWER SUPPLY WITH SWITCHING LOSS REDUCING ELEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a power supply used for performing arc-machining operations such as arc welding, arc cutting and plasma arc-machining. In particular, it relates to an arch-machining power supply that can reduce switching loss incurred when direct current is converted to high-frequency alternating current by a switching device.

2. Description of the Related Art

FIG. 1 of the accompanying drawings is a circuit diagram illustrating a conventional power supply used for performing the arc-machining of an object 2 with a torch 1. The sign DR1 refers to a primary rectifier for converting the output from the commercial power source (AC) to direct current. The sign C1 refers to a capacitor for smoothing the voltage of the converted direct current. The combination of the primary rectifier DR1 and the smoothing capacitor C1 provides the DC power source of the illustrated system.

The conventional power supply system includes an inverter provided by the bridge connection of first to fourth switching elements TR1~TR4. The first and the fourth elements TR1, TR4 make a first switching pair, while the second and the third elements TR2, TR3 make a second switching pair. For conversion of the direct current to the high-frequency alternating current, the first and the second switching pairs are alternately turned on and off in accordance with the first to fourth driving signals Tr1~Tr4 supplied from a switch driver, or inverter driver SD.

When the switching elements TR1~TR4 are changed from the on-state to the off-state, a high voltage (surge) of the polarity reverse to that of the elements TR1~TR4 may occur. To protect the elements TR1~TR4 from the surge, four diodes DR3~DR6 are connected in parallel to bypass the elements TR1~TR4. A main transformer INT, connected to the inverter, is provided for changing the primary voltage to a secondary voltage suitable for arc-machining. The secondary coil of the transformer INT is connected to a secondary rectifier DR2 that converts the AC output of the transformer INT to direct voltage for the arc-machining. This voltage is supplied via a direct current reactor DCL.

An output current detector ID outputs an output current detection signal Id. A comparison operator ER compares this detection signal Id with an output current setup signal Ir, and produces a comparison signal Er=Ir−Id. An output controller SC performs PWM (pulse width modulation) control, in which the frequency of the pulse remains the same, while the width of the pulse is varied. Specifically, based on the comparison signal Er, the output controller SC controls the pulse width of a first output control signal Sc1 (see Sc1 in FIG. 2) and that of a second output control signal Sc2 (see Sc2 in the same figure).

The switch driver SD outputs first and fourth driving signals Tr1, Tr4, both of which are identical, based on the first output control signal Sc1, and also outputs second and third driving signals Tr2, Tr3, both of which are identical, based on the second output control signal Sc2.

FIG. 2 is a timing chart showing the relationships among the first output control signal Sc1, the second output control signal Sc2, the first driving signal Tr1 (which is the same as the fourth driving signal Tr4), the second driving signal Tr2 (which is the same as the third driving signal Tr3), the superposed collector-emitter voltage V1 (solid lines) & collector current Ic1 (broken lines) of the first switching element TR1, and the superposed collector-emitter voltage V2 (solid lines) & collector current Ic2 (broken lines) of the second switching element TR2.

The workings of the first and the second switching elements TR1, TR2 will now be described. It should be noted that the third and the fourth switching elements TR3 and TR4 behave in the same manner as the first and the second switching elements, and therefore they will not be discussed below.

First, the startup switch TS shown in FIG. 1 outputs a startup signal Ts to the output controller SC. Upon receiving the signal, the controller SC outputs the first output control signal Sc1 and the second output control signal Sc2 shifted half cycle relative to the first output control signal Sc1. As shown in FIG. 2, the first and the second output control signals Sc1, Sc2 have pulse durations T1 and T2, respectively, that are determined by the comparison signal Er (=Ir−Id).

In general, the switching elements will take a relatively long time to change from the on-state to the off-state than from the off-state to the on-state. Due to this, without taking any countermeasures, the turn-on states of the first and the second switching pairs would overlap, whereby "arm short-circuiting" occurs. To prevent this, there is an appropriate pause T7 (see FIG. 2) between the on-state of the drive signal Tr1 and the on-state of the drive signal Tr2.

At t=t1, the switch driver SD outputs the first drive signal Tr1 and the fourth drive signal Tr4. Upon receiving this, the first and the fourth elements TR1, TR4 change from the off-state to the on-state. At this time, a switching loss (called "turn-on loss" below) occurs, as represented by the region Ln1 in FIG. 2.

At t=t2 (FIG. 2), the switch driver SD, in synchronism with the first output control signal Sc1, turns off the first and the fourth drive signals Tr1, Tr4. Accordingly, the first and the fourth elements TR1, TR4 change from the on-state to the off-state, which results in the switching loss, or "turn-off loss", as shown by the region Lf1. In addition to this, saturation loss (not shown) will occur when the first and the fourth elements TR1, TR4 are operating in the saturation region during the on-period T3.

When the above-mentioned pause T7 expires, the first and the fourth elements TR1, TR4, for example, change from the on-state to the off-state, while the second and the third elements TR2, TR3 have already been in the off-state. Thus, a surge voltage will occur across the emitter and the collector of the first and the fourth elements TR1, TR4. The surge voltage is conducted through the bypassing diodes DR3~DR6, to be absorbed by the smoothing capacitor C1.

The turn-off loss will now be described. During the transition period from the on-state to the off-state, the first and the fourth elements TR1, TR4 are unsaturated. At this time, the collector current Ic1 of the first element TR1 (and that of the fourth element TR4) reduces than when the element is saturated, while the collector-emitter voltage V1 of the element TR1 (and that of the element TR4) increase. The turn-off loss is determined by the product of the collector current Ic1 and the collector-emitter voltage V1 (see the region Lf1 in FIG. 2). If IGBTs (Insulated Gate Bipolar Transistors) are used for the first and the fourth elements TR1, TR4, the collector current Ic will become zero rather slowly after the collector-emitter voltage V1 arises. As a result, the turn-off loss becomes greater.

The turn-on loss will now be described. During the transition from the off-state to the on-state, the first and the fourth elements TR1, TR4 (or TR2, TR3) become saturated. Due to this, the collector-emitter voltage V1 of the first element (and that of the fourth element as well) decreases than in the off-state, while the collector current Ic1 of the first element (and that of the fourth element) increases. The product of the collector current Ic1 and the collector-emitter voltage V1 produces the turn-on loss (see the region Ln1 shown in FIG. 2). The turn-on loss is very small in comparison with the turn-off loss, and its effect is negligible.

Next, the saturation loss will be described. When the first and the fourth elements TR1, TR4 are saturated in the on-state, the collector current Ic of the first element TR1 is a rated current, and the collector-emitter voltage V1 is a saturated voltage. Under this condition, a saturation loss occurs, which is determined by the product of the collector current Ic1 and the collector-emitter voltage V1. The saturation voltage depends on the properties of the switching elements and the drive conditions. Further, the saturation less, not affected by the switching frequency, is essentially constant. Thus, the present invention does not address the reduction of the saturation loss.

At t=t3 shown in FIG. 2, the switch driver SD outputs the second drive signal Tr2 and the third drive signal Tr3. Upon receiving the signal, the second element TR2 and the third element TR3 change from the off-state to the on-state. At this time, a switching loss represented by the region Ln2 will occur.

In synchronism with the second output control signal Sc2, the switch driver SD turns off the second and the third drive signals Tr2, Tr3 at t=t4 (FIG. 2). Thus, the second and the third elements TR2, TR3 change from the on-state to the off-state, and a turn-off loss represented by the region Lf2 will occur. In addition, a saturation loss will occur since the second and the third elements TR2, TR3 operate in the saturated region during the on-period T4. The on-periods T3 and T4 are the same in length.

In the conventional inverter circuit, an unduly great switching loss ("turn-off loss") will occur when the elements TR1~TR4 change from the on-state to the off-state. When the frequency of the inverter circuit is increased, the number of switching operations per unit time is increased. As a result, the switching loss per unit time becomes greater. This requires a larger cooling device for preventing the overheat of the switching elements TR1~TR4. Accordingly, the power supply as a whole becomes bigger, which results in increased costs.

SUMMARY OF THE INVENTION

The present invention has been proposed under the circumstances described above. It is, therefore, an object of the present invention to provide an arc-machining power supply whereby the switching loss can be significantly reduced than the conventional apparatus.

According to the present invention, there is provided an arc-machining power supply that comprises: a DC circuit that outputs DC voltage; an inverter circuit that includes a pair of first and fourth switching elements and another pair of second and third switching elements, the first to the fourth switching elements being connected to form a bridge circuit for converting the DC voltage to high-frequency AC voltage; a transformer that converts the high-frequency AC voltage to a voltage suitable for a desired arc-machining process; a rectifier circuit that rectifies the voltage converted by the transformer for output of DC voltage; a power on/off device arranged between the DC circuit and the inverter circuit for controlling an output from the DC circuit to the inverter circuit; an auxiliary capacitor for turning on the power on/off device when input voltage to the power on/off device is substantially equal to output voltage from the power on/off device; an output control circuit that supplies first and second output control signals for performing required feedback control, the first output control signal being offset from the second output control signal by half a cycle; a power on/off driver that turns on the power on/off device when the first output control signal changes to a high level, and turns off the power on/off device when the first output control signal changes to a low level; and an inverter driver that turns on the first and the fourth switching elements when the first output control signal changes to the high level, and turns off the first and the fourth switching elements when the first output control signal changes to the low level and a predetermined capacitor discharge period elapses, the inverter driver being also arranged to turn on the second and the third switching elements when the second output control signal changes to a high level, and turn off the second and the third switching elements when the second output control signal changes to a low level and a predetermined capacitor discharge period elapses.

Preferably, the power on/off driver may further turn on the power on/off device when the second output control signal changes to a high level, and may also turn off the power on/off device when the second output control signal changes to a low level.

Preferably, the power supply of the present invention may further comprise a smoothing circuit that includes first and second smoothing capacitors of a same capacitance which are connected in series, the smoothing circuit being connected in parallel to the DC circuit. The power on/off device includes a first power on/off switch and a second power on/off switch, the first power on/off switch being arranged between a plus side of the DC circuit and a plus side of the inverter circuit for controlling the output of the DC circuit, the second power on/off switch being arranged between a minus side of the DC circuit and a minus side of the inverter circuit for controlling the output of the DC circuit.

Preferably, the power supply of the present invention may further comprise two diodes, wherein one of the two diodes is arranged between a middle point of the smoothing circuit and an emitter side of the first power on/off switch, the other of the two diodes being arranged between the middle point of the smoothing circuit and a collector side of the second power on/off switch.

Preferably, the power supply of the present invention may further comprise first and second surge return switches, wherein the first surge return switch is arranged between a middle point of the smoothing circuit and an emitter side of the first power on/off switch for conducting a surge voltage to the smoothing circuit, the surge voltage occurring when the first and the fourth switching elements are turned off, and wherein the second surge return switch is arranged between the middle point of the smoothing circuit and a collector side of the second power on/off switch for conducting another surge voltage to the smoothing circuit, said another surge voltage occurring when the second and the third switching elements are turned off.

Preferably, the power on/off driver may turn on the first power on/off switch when the first output control signal changes to a high level, while also turning on the second power on/off switch when the second output control signal changes to a high level. Further, the power on/off driver may turn off the first power on/off switch when the first output control signal changes to a low level, while also turning off the second power on/off switch when the second output control signal changes to a low level.

Preferably, the inverter driver may turn on the first surge return switch when the first output control signal changes to a low level and the capacitor discharge period elapses, the turned-on first surge return switch being turned off after a predetermined length of time. Further, the inverter driver may turn on the second surge return switch when the second output control signal changes to a low level and the capacitor discharge period elapses, the turned-on second surge return switch being turned off after a predetermined length of time.

Preferably, the capacitor discharge period may have a start point and an end point. The start point may be defined as a point of time when either of the first and the second output control signals changes to a low level, while the end point may be defined as a point of time when an output discharge from the auxiliary capacitor becomes smaller than a predetermined threshold.

Other features and advantages of the present invention will become apparent from the detailed description given below with reference to the accompanying drawings.

DETAILED DESCRIPTION OF THE PREFERRED EMBODIMENT

Preferred embodiments of the present invention will be described below with reference to the accompanying drawings.

Figure 1:
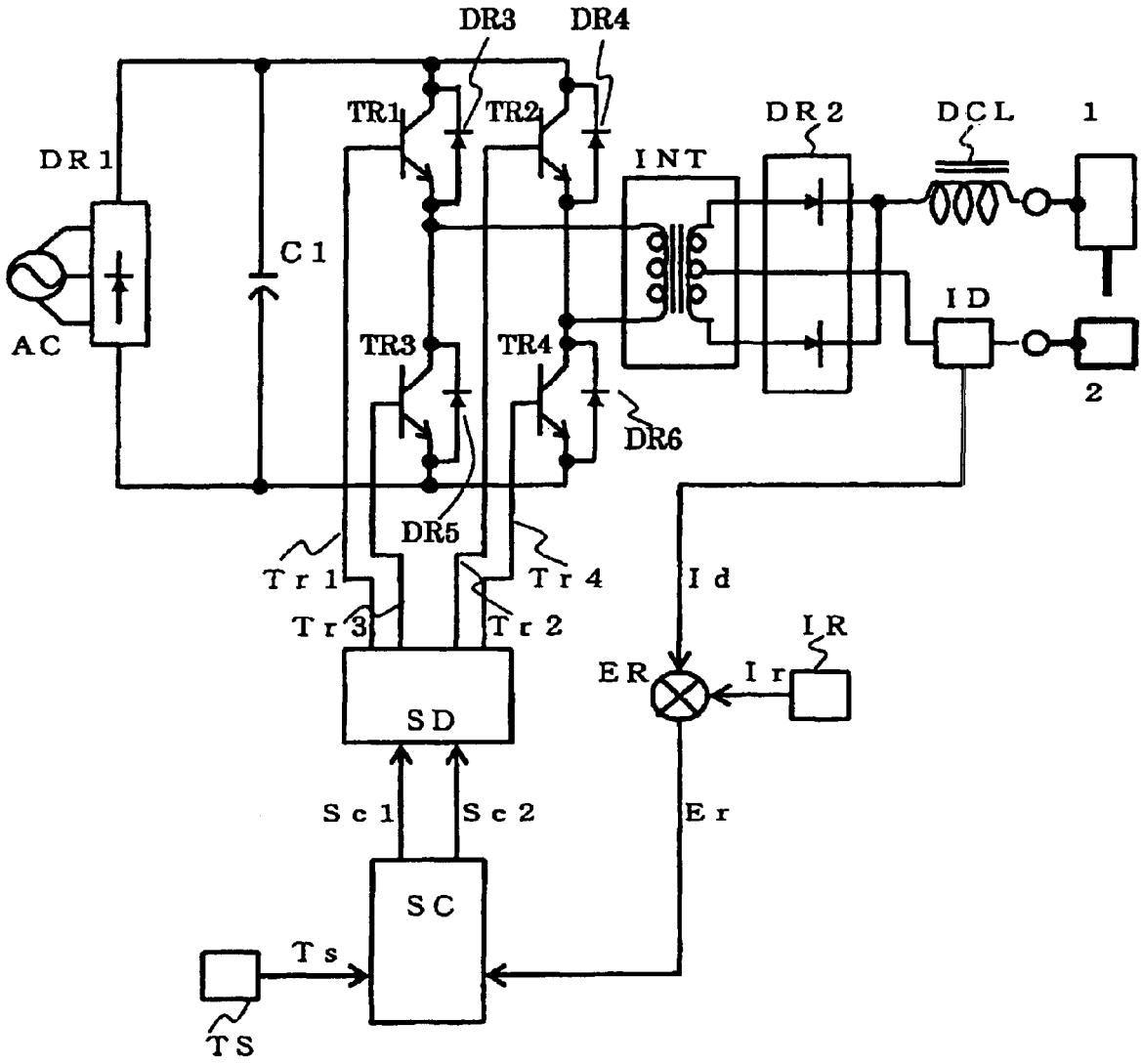
FIG.1 PRIOR ART
FIG. 1 is a circuit diagram showing a conventional arc-machining power supply.
Figure 2:
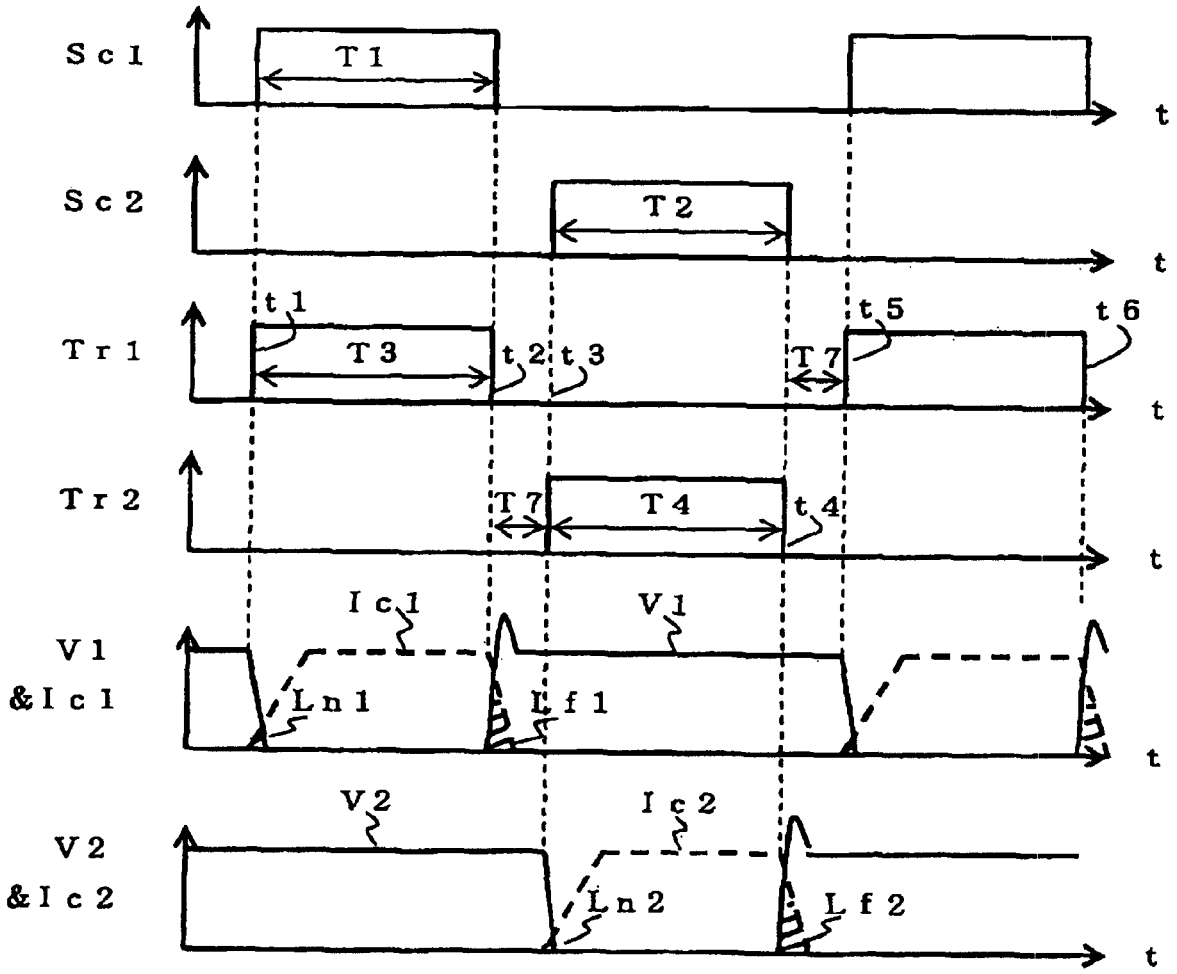
FIG.2 PRIOR ART
FIG. 2 is a timing chart illustrating the workings of the conventional power supply.
Figure 3:
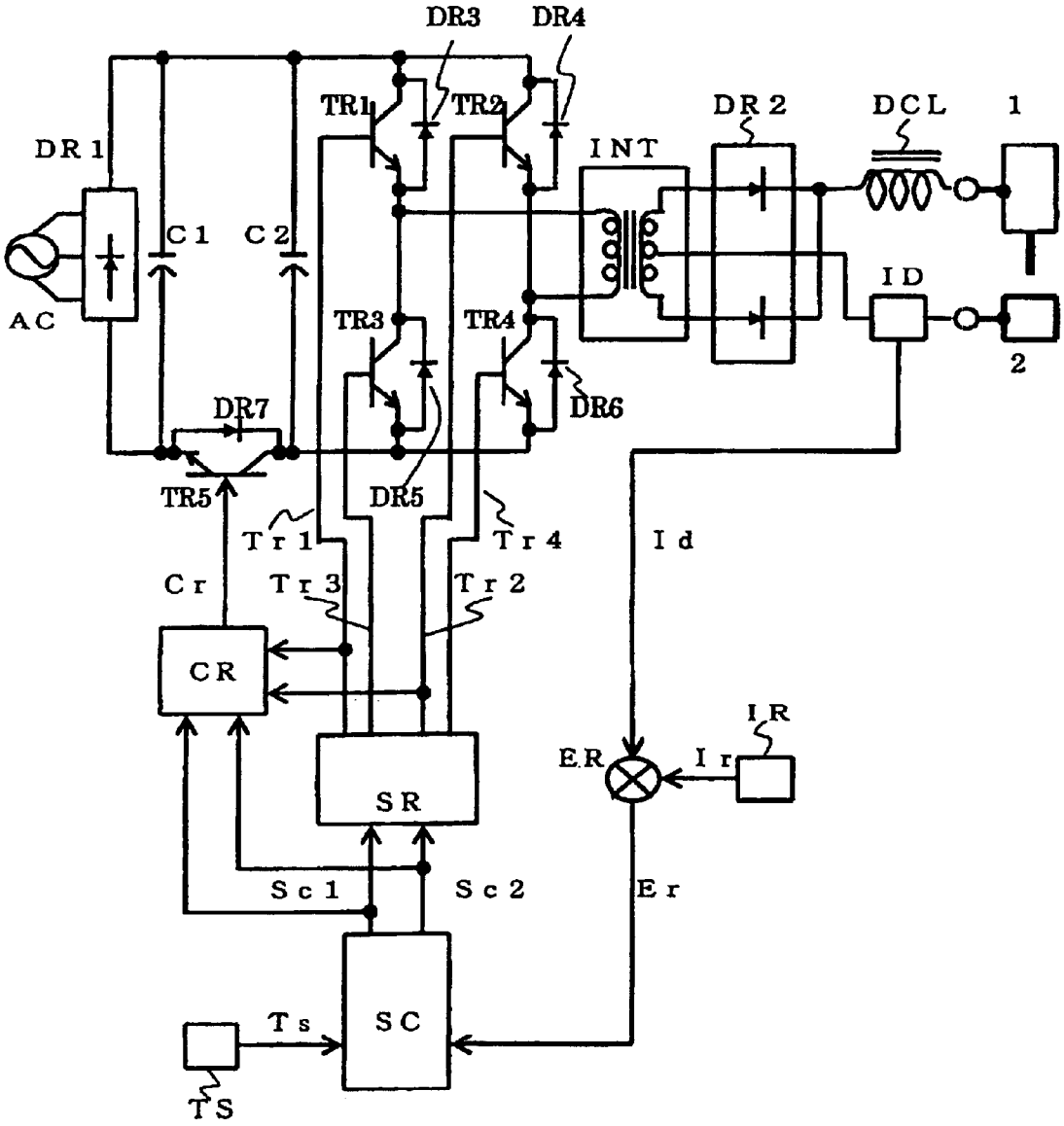
FIG. 3 is a circuit diagram showing an arc-machining power supply according to an embodiment of the present invention.

FIG. 3 shows an arc-processing power supply according to a first embodiment of the present invention. As seen from the comparison between FIG. 3 and FIG. 1, the power supply of the present invention includes the same components as those used in the conventional power supply. In FIG. 3, these common parts are designated by the same reference signs as used in FIG. 1. The workings of the common components are the same as those of the conventional counterparts, and the explanation about them may not be repeated below.

In the present invention again, the first switching pair is made up of first and fourth switching elements TR1, TR4, and the second switching pair is made up of second and third switching elements TR2, TR3. The first and the fourth elements TR1, TR4 operate in the same manner, and the second and the third elements TR2, TR3 operate in the same manner. Thus, the workings of the first element TR1 and the second element TR2 only will be described below.

In the power supply of FIG. 3, a switching element TR5 is disposed between the smoothing capacitor C1 and an auxiliary capacitor C2, these three components being connected in series. The switching element TR5 serves as a chopper for controlling the voltage from the DC supply circuit. The switching element TR5 is bypassed by a diode DR7 for protection against high voltage which would otherwise be applied across the element TR5.

The auxiliary capacitor C2 is provided for enabling the null voltage switching of the switching element TR5. Even if the auxiliary capacitor C2 is not provided, the voltage applied to the inverter circuit becomes zero when the switching element TR5 is turned off. Under this condition, it is possible for the switching elements of the inverter circuit to perform the null voltage switching. However, the switching element TR5 suffers from some switching loss. With the auxiliary capacitor C2 provided, on the other hand, the voltage applied to the switching element TR5 becomes zero. As a result, the null voltage switching of the element TR5 can be performed, while the switching elements of the inverter circuit can be turned off at zero volt.

A switch or inverter driver SR outputs a first driving signal Tr1 and a fourth driving signal Tr4 when the first output control signal Sc1 is changed to a High level. Then, when the control signal Sc1 is changed to a Low level, the inverter driver SR stops the output of the first and fourth driving signals Tr1, Tr4 after a prescribed discharge period Ta for the auxiliary capacitor has lapsed. Then, when the second output control signal Sc2 is changed to a High level, the inverter driver SR outputs a second driving signal Tr2 and a third driving signal Tr3. Then, when the control signal Sc2 is changed to a Low level, the inverter driver SR stops the output of the second and third driving signals Tr2, Tr3 after the discharge period Ta has lapsed.

A power on/off driving circuit CR calculates the logical OR of the first and the second output control signals Sc1, Sc2, and also the logical OR of the first element driving signal Tr1 and the second element driving signal Tr2. Further, the driving circuit CR calculates the logical AND of the two results obtained by the logical OR. The driving circuit CR outputs the result of the logical AND as a power on/off driving signal Cr.

Figure 4:
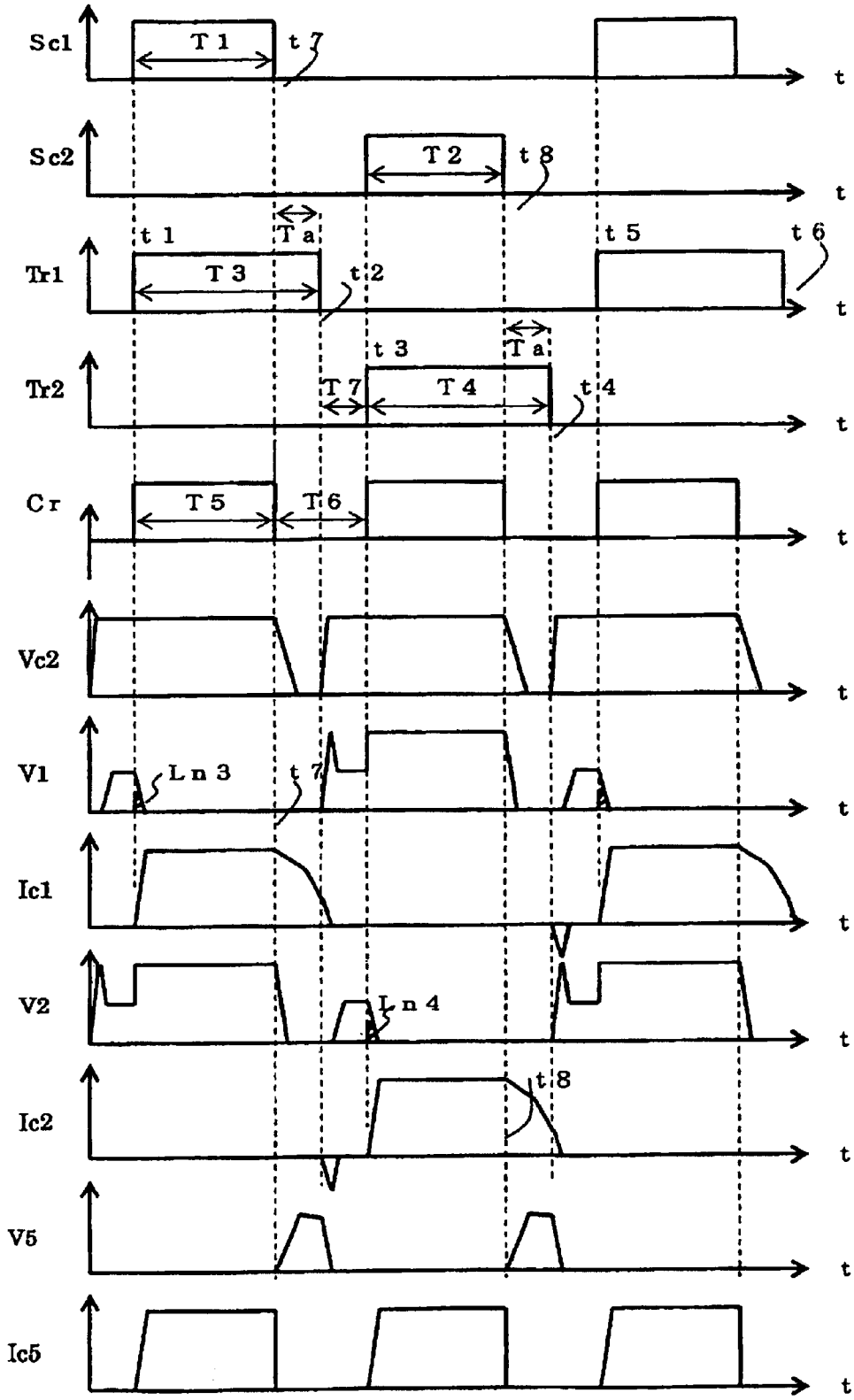
FIG. 4 is a timing chart illustrating the workings of the power supply of the present invention.

Reference is now made to the timing chart shown in FIG. 4 that illustrates the workings of the power supply of FIG. 3. In the chart, the reference sign Sc1 refers to the first output control signal, the Sc2 to the second output control signal, the Tr1 to the first element driving signal, the Tr2 to the second element driving signal, the Cr to the power on/off driving signal, the Vc2 to the terminal voltage of the auxiliary capacitor C2, the V1 to the collector-emitter voltage of the first element TR1, the Ic1 to the collector current of the first element TR1, the V2 to the collector-emitter voltage of the second element TR2, the Ic2 to the collector current of the second element TR2, the V5 to the collector-emitter voltage of the power on/off switching element TR5, and the Ic5 to the collector current of the switching element TR5.

Upon receiving a startup signal Ts from the startup switch TS (see FIG. 3), the output control circuit SC outputs the first and the second output control signals Sc1, Sc2. The first signal Sc1 has a pulse width T1, and the second signal Sc2 has a pulse width T2. These pulse widths are determined by the comparison signal Er. Upon receiving the first output control signal Sc1 at t=t1, the inverter driver SR outputs a first driving signal Tr1 and a fourth driving signal Tr4 identical to the first signal Tr1. Based on these signals, the first and the fourth elements TR1, TR4 are changed from the off-state to the on-state. Thus, the collector current Ic1 of the first switching element flows. Further, the turn-on loss represented by the region Ln3 in FIG. 3 occurs at the first and the fourth elements TR1, TR4. The turn-on loss is determined by the product of the collector current Ic1 and the collector-emitter voltage V1.

At t=t7, the first output control signal Sc1 is turned off. Then, after the predetermined discharge period Ta for the auxiliary capacitor has lapsed (i.e., at t=t2), the inverter driver SR turns off the first driving signal Tr1 and the fourth driving signal Tr4. During the period T3 (=T1+Ta), the first and the fourth switching elements TR1, TR4 are in the on-state, and saturation loss will occur.

At t=t7, the power on/off driving signal Cr is turned off together with the output control signal Sc1. Accordingly, the switching element TR5 is changed from the on-state to the off-state, thereby terminating the DC voltage supply from the DC circuit. During the on-state period T5, saturation loss occurs at the switching element TR5.

At t=t2, the first and the fourth driving signals Tr1, Tr4 are turned off, whereby the first and the fourth elements TR1, TR4 are changed to the off-state. At this time, the terminal voltage Vc2 of the auxiliary capacitor C2, is already zero. Thus, the first and the fourth elements TR1, TR4 are turned off with the input and the output voltages being substantially zero, and therefore the turnoff loss can be substantially zero. For avoiding the above-described arm shorting, the pause T7 is set between t=t2 and t=t3.

At t=t3, the power on/off driving signal Cr is turned on in synchronism with the second element driving signal Tr2. Accordingly, the switching element TR5 is changed to the on-state. At this state, the auxiliary capacitor C2 is fully charged, which is indirectly related to the leakage inductance of the main transformer INT. Thus, the switching element TR5 can be turned on, with the input and the output voltages being substantially the same.

At t=t3, upon receiving the second output control signal Sc2, the inverter driver SR outputs the second element driving signal Tr2 and the third element driving signal Tr3 to change the second and the third elements TR2, TR3 to the on-state from the off-state. At this stage, the collector current Tc2 of the second element flows, and the switching loss (turn-on loss) represented by the region Ln4 occurs at the second and the third elements TR2, TR3.

At t=t8 the second output control signal Sc2 is turned off. Then, at t=t4 (after the predetermined discharge period Ta of the auxiliary capacitor has lapsed), the inverter driver SR turns off the second and the third element driving signals Tr2, Tr3. During the period T4 (=T2+Ta), the second and the third elements TR2, TR3 are in the on-state, and saturation loss occurs. The power on/off driving signal Cr for the driving circuit CR is turned off together with the second output control signal Sc2. During the on-period T5 for the switching element TR5, saturation loss will occur. When the switching element TR5 is turned off, the supply of the DC voltage from the DC supply circuit is stopped.

At t=t4, the second and the third element driving signals Tr2, Tr3 are turned off, to change the second and the third elements TR2, TR3 to the off-state. At this stage, the terminal voltage Vc2 across the auxiliary capacitor C2 is already zero. The second and the third elements TR2, TR3 are turned off, with the input and the output voltages being substantially the same (zero volt), whereby the turn-off loss can be substantially zero.

The collector-emitter voltage V5 of the switching element TR5 at between t=t7 and t=t2 is caused by the discharging and recharging of the auxiliary capacitor C2 during the off-period T6 of the switching element TR5. The collector current Ic5 of the switching element TR5 at between t=t1 and t=t7 is the collector current Ic1 passing through the first switching pair (i.e., TR1 and TR4). Similarly, The collector current Ic5 at between t=t3 and t=t8 is the collector current Ic2 passing through the second switching pair (i.e., TR2 and TR3).

Figure 5:
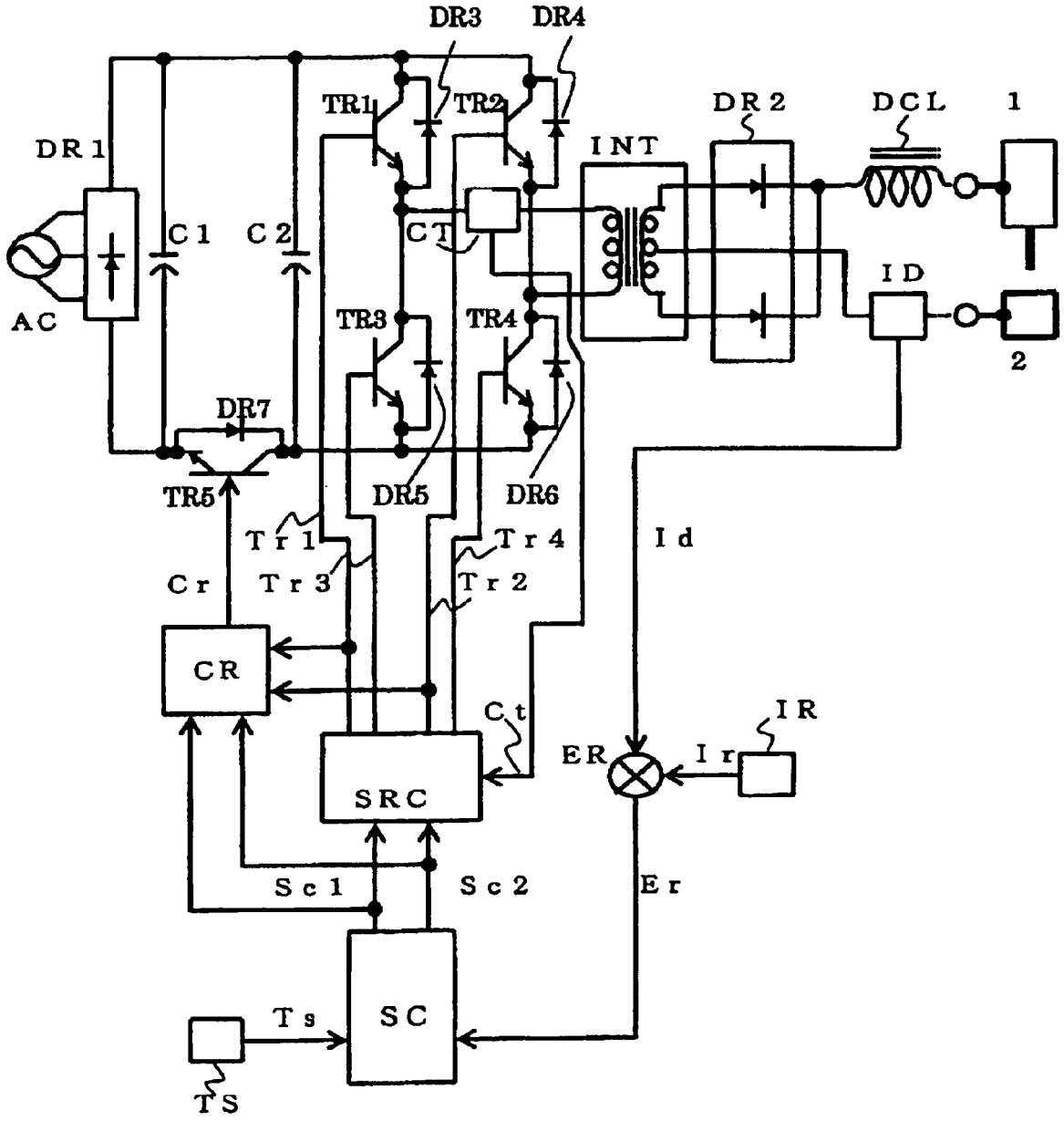
FIG. 5 is a circuit diagram showing an arc-machining power supply according to a second embodiment of the present invention.

Reference is now made to FIG. 5 which is a circuit diagram showing an arc-machining power supply according to a second embodiment of the present invention. In FIG. 5, the same reference signs are used for indicating the same components (having the same functions) as those shown in FIG. 3.

Figure 6:
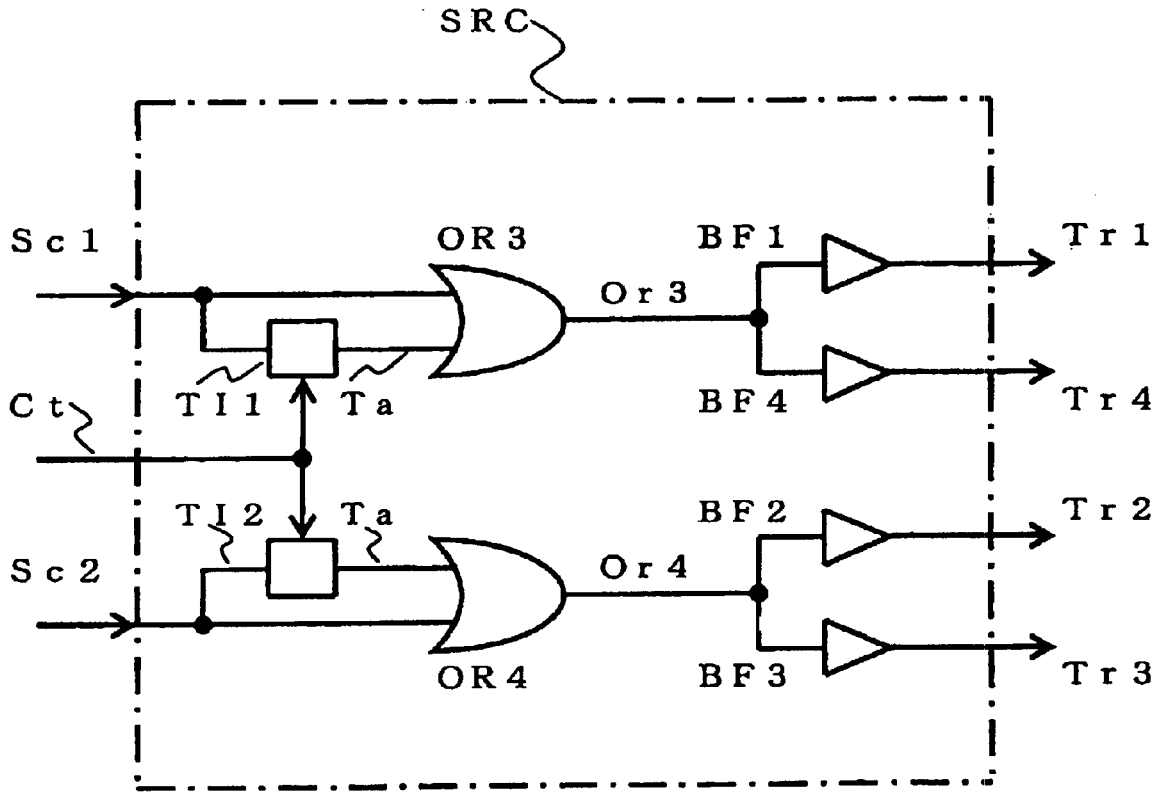
FIG. 6 shows the principal components of the inverter driver SRC shown in FIG. 5.

The power supply of the second embodiment includes a primary current detecting circuit CT arranged between the primary coil of the transformer INT and a node connecting the first and the third elements TR1, TR3. The detecting circuit CT detects a primary current (the discharge current from the auxiliary capacitor C2) and outputs a primary current detection signal Ct. This detection signal Ct is inputted to the inverter driver SRC. As shown in FIG. 6, the driver SRC is composed of two OR gates OR3, OR4, two inverter-setup time circuits T11, T12 for the primary current, and four buffer gates BF1~BF4. The first time circuit T11 begins to operate when the first output control signal Sc1 is turned off. The time circuit T11 changes the discharge period Ta of the auxiliary capacitor in accordance with the first current detection signal Ct. When the value of the detection signal Ct becomes smaller than a predetermined threshold, the time circuit T11 terminates the discharge period Ta. The OR gate OR3 calculates the logical OR of the first output control signal Sc1 and the discharge period Ta, to output an OR signal Or3. Then, the OR signal Or3 is split by the first and the fourth buffer gates BF1, BF4, to be outputted as the first driving signal Tr1 and the fourth driving signal Tr4. The second time circuit T12 behaves like the first time circuit T11.

Referring to the timing chart shown in FIG. 4, the operations of the second embodiment shown in FIG. 5 will now be described. When the first output control signal Sc1 is inputted to the inverter driver SRC at t=t1, the inverter driver SRC outputs the first driving signal Tr1 and the identical fourth driving signal Tr4. Thus, the first and the fourth elements TR1, TR4 are changed to the on-state from the off-state. When the first output control signal Sc1 is turned off at t=t7, the first time circuit T11 begins to operate, and determines the output duration of the signal for the period Ta in accordance with the first current detection signal Ct.

Figure 7:
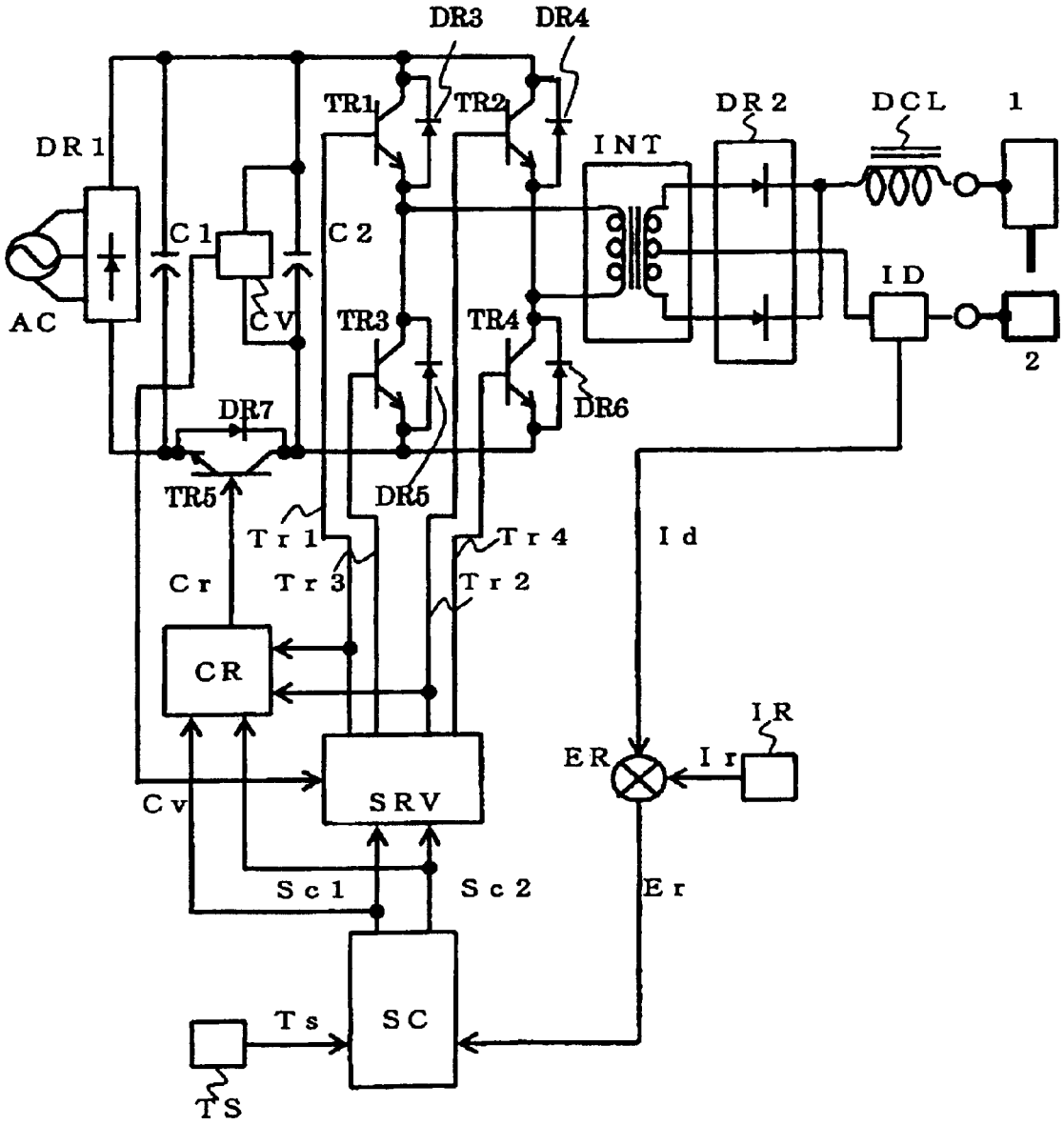
FIG. 7 is a circuit diagram showing an arc-machining power supply according to a third embodiment of the present invention.

FIG. 7 is a circuit diagram showing an arc-machining power supply according to a third embodiment of the present invention. In FIG. 7, components identical or similar to those shown in FIG. 3 are indicated by the same reference signs as used in FIG. 3. The power supply of the third embodiment is the same as that of the first embodiment except for the differences described below.

The power supply of FIG. 7 is provided with a primary voltage detection circuit CV which is connected in parallel to the auxiliary capacitor C2 for detection of the discharge voltage of the capacitor C2. The result of the detection is outputted as a voltage detection signal Cv.

Figure 8:
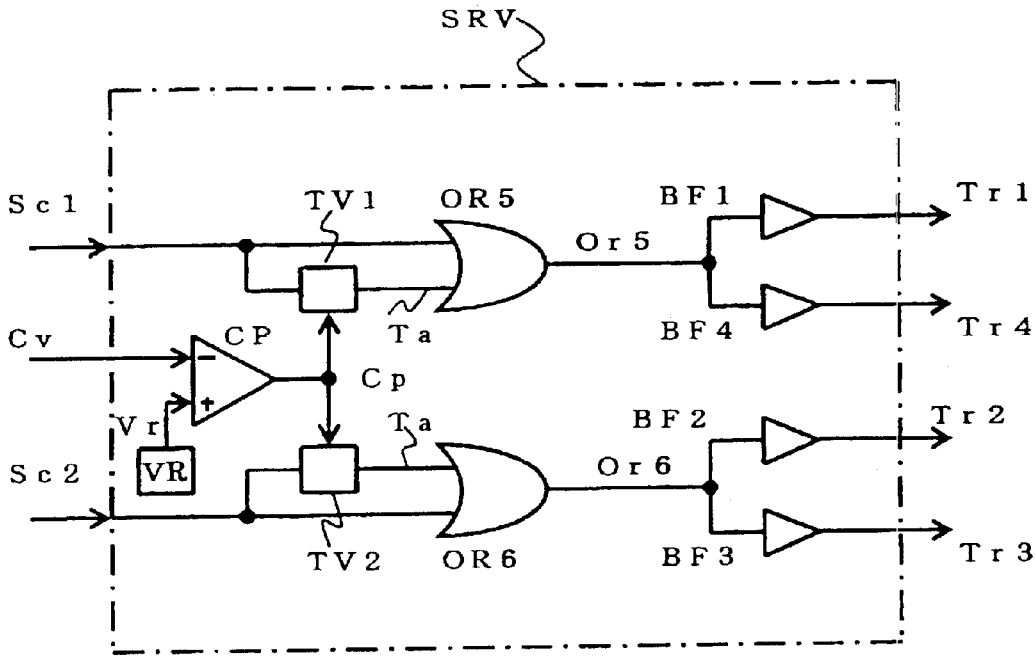
FIG. 8 shows the principal components of the inverter driver SRV shown in FIG. 7.

As shown in FIG. 8, the inverter driver SRV of the third embodiment is provided with a voltage comparator CP and a reference voltage setup circuit VR, none of which are present in the inverter driver SRC of FIG. 6. The inverter driver SRV is further provided with an inverter-driving setup time circuit TV1 in place of the time circuit T11 of FIG. 6, and with another inverter-driving setup time circuit TV2 in place of the time circuit T12 of FIG. 6. The voltage comparator CP compares the voltage detection signal Cv with the reference voltage setup signal Vr determined by the reference voltage setup circuit VR. If the signal Cv is smaller than the signal Vr, the voltage comparison signal Cp is turned off. The time circuit TV1 begins to operate when the first output control signal Sc1 is turned off, and outputs the discharge period signal Ta. When the voltage comparison signal Cp is turned off, the circuit TV1 terminates the discharge period signal Ta. The other operations are the same as in the second embodiment.

The workings of the third embodiment shown in FIG. 7 will be described with reference to the timing chart of FIG. 4. When the first output control signal Sc1 is inputted to the inverter driver SRV at t=t1, the inverter driver SRV outputs the first and the fourth element driving signals Tr1, Tr4 to change the first and the fourth elements TR1, TR4 to the on-state from the off-state.

When the output control signal Sc1 is turned off at t=t7, the time circuit TV1 shown in FIG. 8 begins to operate for output of the discharge period signal Ta. Then, the voltage comparator CP compares the voltage detection signal Cv with the reference voltage setup signal Vr determined by the setup circuit VR. If the detection signal Cv is smaller than the setup signal Vr, the voltage comparator CP turns off the comparison signal Cp. When the signal Cp is turned off, the time circuit TV1 terminates the output of the discharge period signal Ta.

Figure 9:
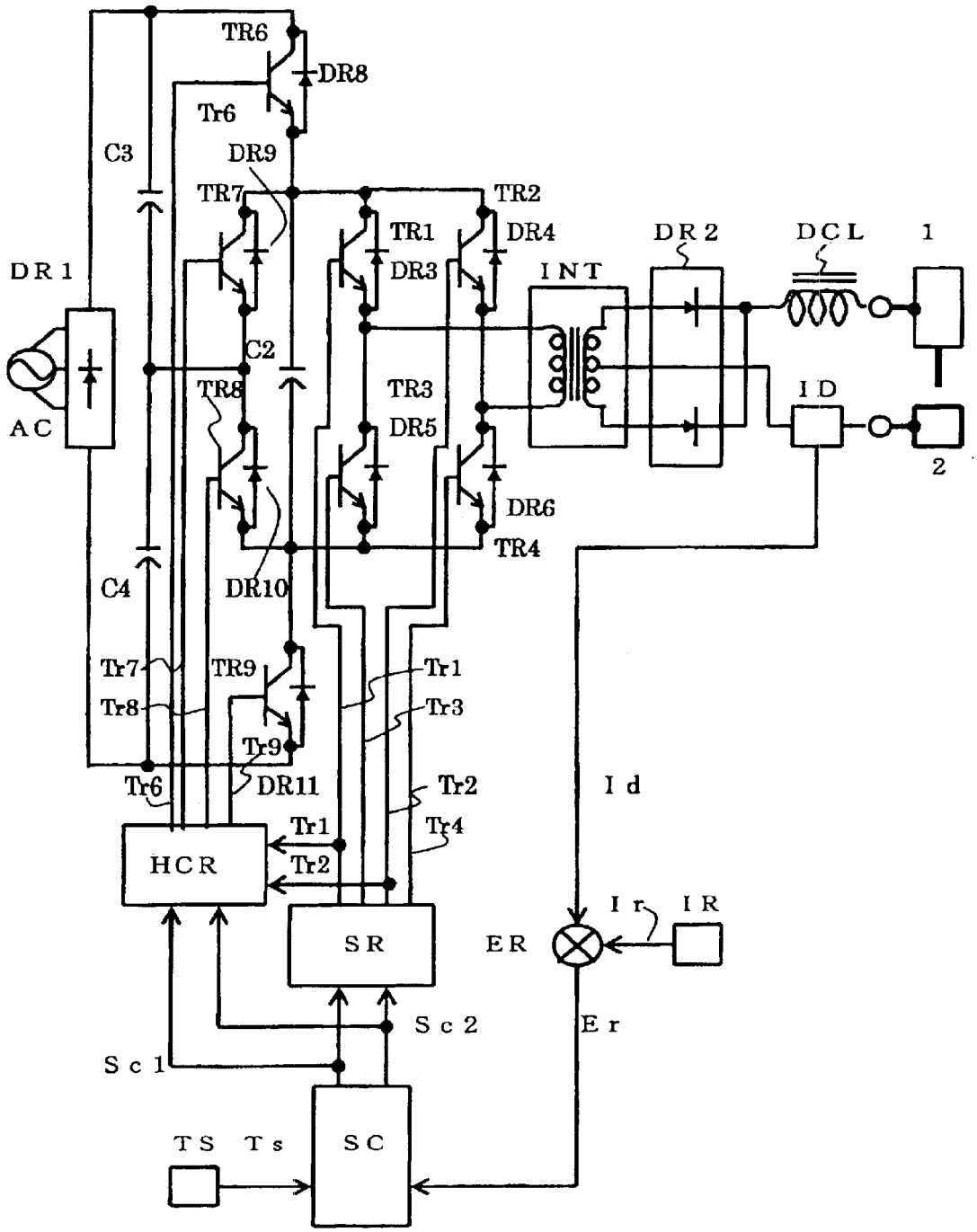
FIG. 9 is a circuit diagram showing a high-voltage arc-machining power supply according to a fourth embodiment of the present invention.

FIG. 9 is a circuit diagram showing an arc-machining power supply according to a fourth embodiment of the present invention. In FIG. 9, components identical or similar to those shown in FIG. 3 are indicated by the same reference signs used in FIG. 3.

The first and the second smoothing capacitors C3, C4 are connected in series to each other, while the combination of them is connected in parallel to the primary rectifier DR1. The capacitances of the two capacitors C3, C4 are the same. The commercial alternating power supply AC supplies voltage ranging from 380V−15% to 575V+15%. The combination of the rectifier DR1 and the smoothing capacitors C3, C4 provides a high-voltage DC circuit.

The switching elements TR6, TR9 are alternately turned on and off for controlling the voltage supply from the high-voltage DC circuit. With the illustrated arrangement, high voltage is charged in the auxiliary capacitor C2 due to the energy of the leakage inductance of the main transformer INT. This voltage can be higher than the rated voltage of the switching elements TR6, TR9. To avoid this, surge voltage bypass elements (or return elements) TR7, TR8 are provided for conducting the undesired voltage of the capacitor C2 to the smoothing capacitors C3, C4.

The auxiliary capacitor C2 is provided for allowing the switching elements TR6, TR9 to be turned on, with substantially equal input and output voltages (zero voltage) applied to them. It should be noted here that, for performing zero-voltage switching, the auxiliary capacitor C2 is not a must since the voltage applied to the inverter circuit becomes zero when the switching elements TR6, TR9 are turned off. Without the capacitor C2, however, all the switching loss would occur at the switching elements TR6 and TR9.

In FIG. 9, the high-voltage power on/off driving circuit HCR calculates the logical AND of the first output control signal Sc1 and the first element driving signal TR1, to output the driving signal Tr6 for the switching element TR6. When the signal Tr1 is turned off, the driving circuit HCR outputs the driving signal Tr7 of a predetermined duration T10 for the surge-evading switching element TR7. Further, the driving circuit HCR calculates the logical AND of the second output control signal Sc2 and the second element driving signal Tr2, to output the driving signal Tr9 for the switching element TR9. When the driving signal Tr2 is turned off, the driving circuit HCR outputs the driving signal Tr8 of a predetermined duration T11 for the surge-evading switching element TR8.

Figure 10:
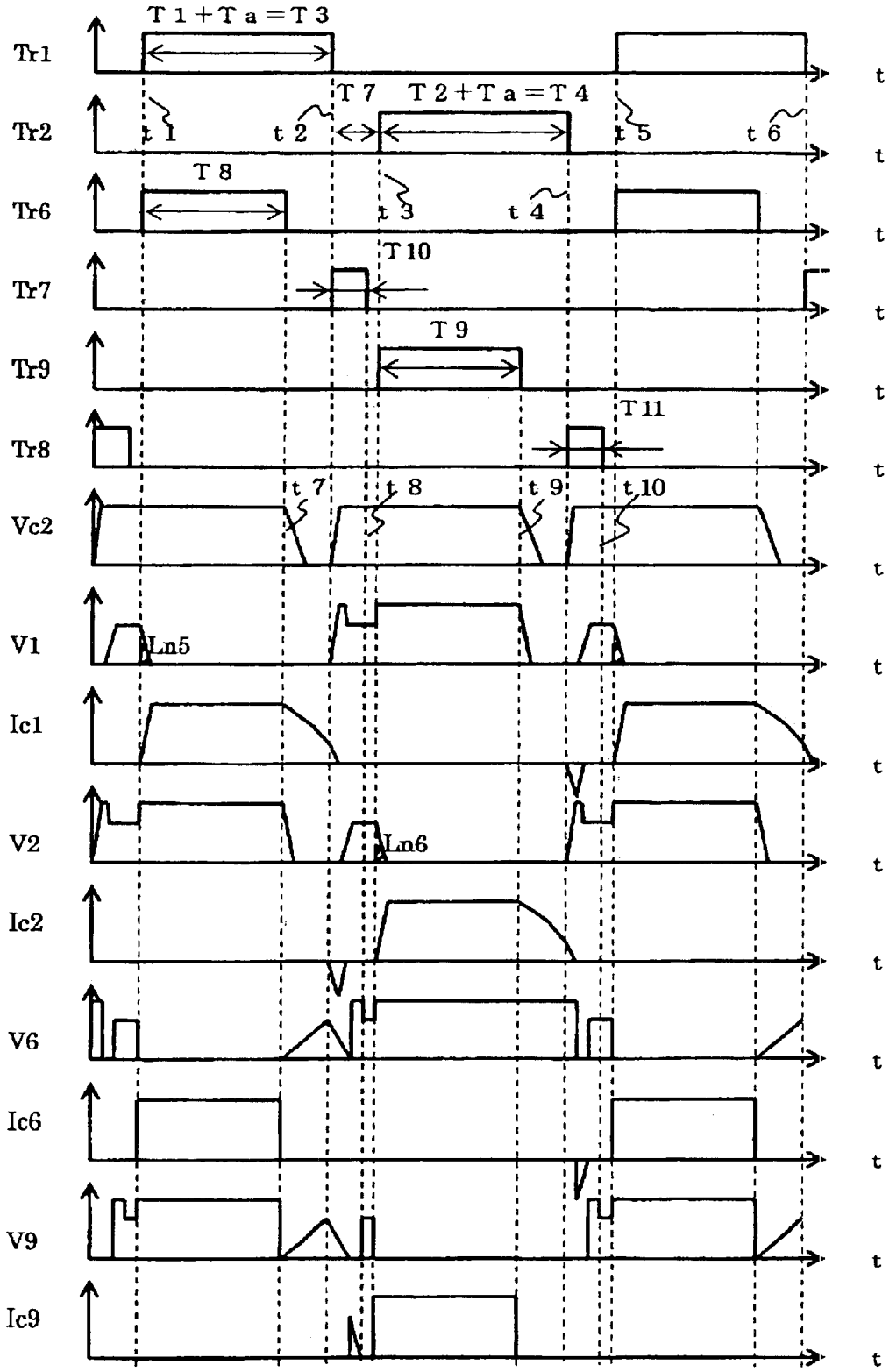
FIG. 10 is a timing chart illustrating the workings of the power supply shown in FIG. 9.

FIG. 10 shows a timing chart for illustrating the workings of the arc-machining power supply of FIG. 9. Viewed from the top to the bottom in FIG. 10, the caption Tr1 refers to the waveform of the first element driving signal Tr1, the caption Tr2 to the waveform of the second element driving signal Tr2, the caption Tr6 to the waveform of the first power supply driving signal Tr6, the caption Tr7 to the waveform of the first surge-evading element driving signal Tr7, the caption Tr9 to the waveform of the second power supply element driving signal Tr9, the caption Tr8 to the waveform of the second surge-evading element driving signal Tr8, the caption Vc2 to the waveform of the voltage applied across the auxiliary capacitor C2, the caption V1 to the waveform of the collector-emitter voltage of the first switching element TR1, the caption Ic1 to the waveform of the collector current of the first element TR1, the caption V2 of the waveform of the collector-emitter voltage of the second switching element TR2, the caption Ic2 to the waveform of the collector current of the second element TR2, the caption V6 to the waveform of the collector-emitter voltage of the first power supply on/off switching element TR6, the caption Ic6 to the collector current of the switching element TR6, the caption V9 to the collector-emitter voltage of the second power supply on/off switching element TR9, and the caption Ic9 to the collector current of the switching element TR9.

At t=t1, the first and the fourth switching elements TR1, TR4 are changed to the on-state from the off-state upon receiving the first and the fourth driving signals Tr1, Tr4. At the same time, the first power supply element driving signal Tr6 is outputted to change the switching element TR6 to the on-state from the off-state. At this stage, the voltage Vc2 across the auxiliary capacitor C2 is equal to E/2, where E is the voltage of the rectified and smoothed power from the power supply AC. The voltage E is halved since the two smoothing capacitors C3, C4 have the same capacitance. As the collector current Ic1 flows, the turn-on loss indicated by the area Ln5 occurs in the first and the fourth switching elements TR1, TR4.

During the turn-on period T8, a saturation loss occurs in the switching element TR6. When the driving signal Tr6 is turned off at t=t7, the switching element TR6 is turned off, and the power supply to the inverter circuit ceases. When the switching element TR6 is turned off, the first smoothing capacitor C3 and the auxiliary capacitor C2 are substantially equally charged. Thus, zero voltage is applied to the switching element TR6, and no turn-off loss occurs.

At t=t2, the driving signals Tr1, Tr4 are turned off, to change the first and the fourth switching elements TR1, TR4 to the off-state from the on-state. This is done after the auxiliary capacitor discharge period Ta has passed (i.e., the auxiliary capacitor C2 has discharged a sufficient amount of charge). Thus, the turn-off loss is substantially zero by the turning-off of the first and the fourth switching elements. Then, when the stored charge of the capacitor C2 becomes substantially zero, the surge-evading switching element TR7 is turned on, which causes no turn-on loss. The element TR7 is held in the on-state for a predetermined period T10.

By turning off the first and the fourth switching elements TR1, TR4, the auxiliary capacitor C2 begins to be charged due to the electromotive force caused by the energy of the leakage inductance of the transformer INT and the capacitor C2. When the voltage Vc2 across the capacitor C2 becomes greater than E/2 (the voltage across the smoothing capacitor C3), a current flows through the surge-evading switching element TR7, and the voltage Vc2 across the capacitor C2 remains to be E/2.

For prevention of the arm short (the short-circuiting in the bridge coupling of the inverter circuit), a pause T7 is provided between t=t2 and t=t3. At t=t3, the driving signals Tr2, Tr3 are outputted to change the second and the third switching elements TR2, TR3 to the on-state from the off-state. Also, the driving signal Tr9 is outputted to change the second power supply on/off switching element TR9 to the on-state from the off-state. The voltage Vc2 across the auxiliary capacitor C2 is E/2. As the collector current Ic2 of the second element flows, the turn-on loss indicated by the area Ln6 occurs in the second and the third switching elements Tr2, TR3.

During the turn-on period T9, a saturation loss occurs in the switching element TR9. When the driving signal Tr9 is turned off at t=t9, the switching element TR9 is turned off, and the power supply to the inverter circuit ceases. When the switching element TR9 is turned off, the smoothing capacitor C4 and the auxiliary capacitor C2 are substantially equally charged. Thus, zero voltage is applied to the switching element TR9, and no turn-off loss occurs.

At t=t4, the driving signals Tr2, Tr3 are turned off, to change the second and the third switching elements TR2, TR3 to the off-state from the on-state. At this stage, the charge stored in the auxiliary capacitor C2 is zero, and thus the turn-off loss is substantially zero. Then, while the stored charge of the capacitor C2 is zero, the surge-evading switching element TR8 is turned on. Advantageously, this causes no turn-on loss. With the second and the third switching elements TR2, TR3 being turned off, the auxiliary capacitor C2 begins to be charged due to the electromotive force caused by the energy of the leakage inductance of the transformer INT associated with the capacitor C2.

For preventing the arm short, a pause is provided between t=t4 and t=t5.

Thereafter, the above-described processes are repeated.

Figure 11:
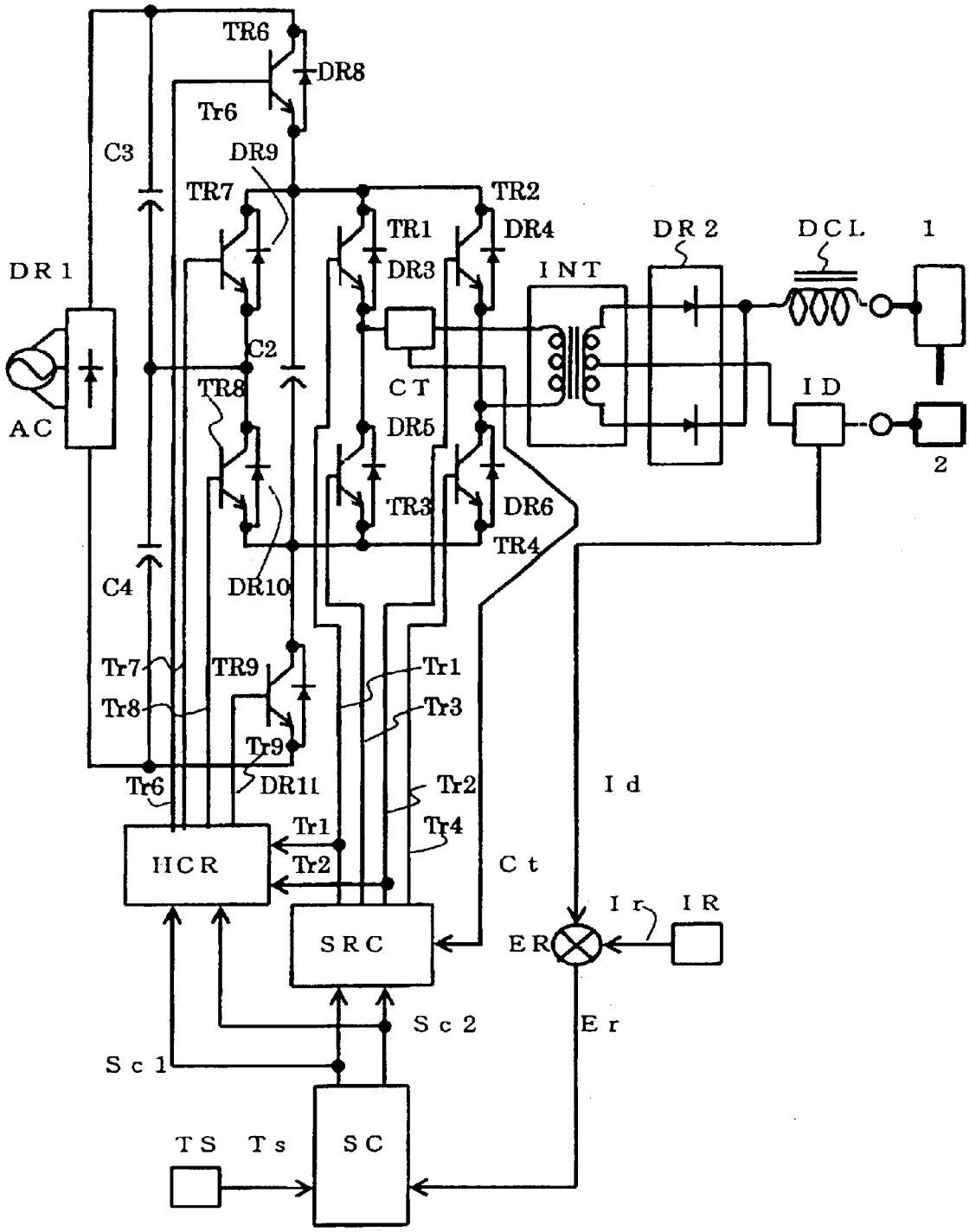
FIG. 11 is a circuit diagram showing a high-voltage arc-machining power supply according to a fifth embodiment of the present invention.

FIG. 11 is a circuit diagram showing a high-voltage arc-machining power supply according to a fifth embodiment of the present invention. In FIG. 11, components identical or similar to those of the fourth embodiment are indicated by the same reference signs as used in FIG. 9.

A current detecting circuit CT is arranged between the primary coil of the transformer INT and a node connecting the first and the third switching elements TR1, TR3. The detecting circuit CT detects a primary current (i.e., the current discharged from the auxiliary capacitor C2) and outputs a current detection signal Ct. The inverter driver SRC performs the same functions as those of the inverter driver of the second embodiment.

The workings of the power supply of the fifth embodiment will be described with reference to the timing chart shown in FIG. 10. At t=t1, the first output control signal Sc1 (not shown in FIG. 10) is inputted to the inverter driver SRC. Upon receiving the signal, the inverter driver SRC outputs the switching element driving signals Tr1, Tr4 to change the first and the fourth switching elements TR1, TR4 to the on-state from the off-state.

At t=t7, the output control signal Sc1 is turned off, and the switching element setup time circuit T11 begins to operate to output a switching element setup signal Ta. The on-period of the signal Ta is determined on the basis of the current detection signal (i.e., the current discharged from the auxiliary capacitor C2) Ct. Specifically, when the current detection signal Ct is smaller than a predetermined threshold, the on-period of the signal Ta is terminated.

Figure 12:
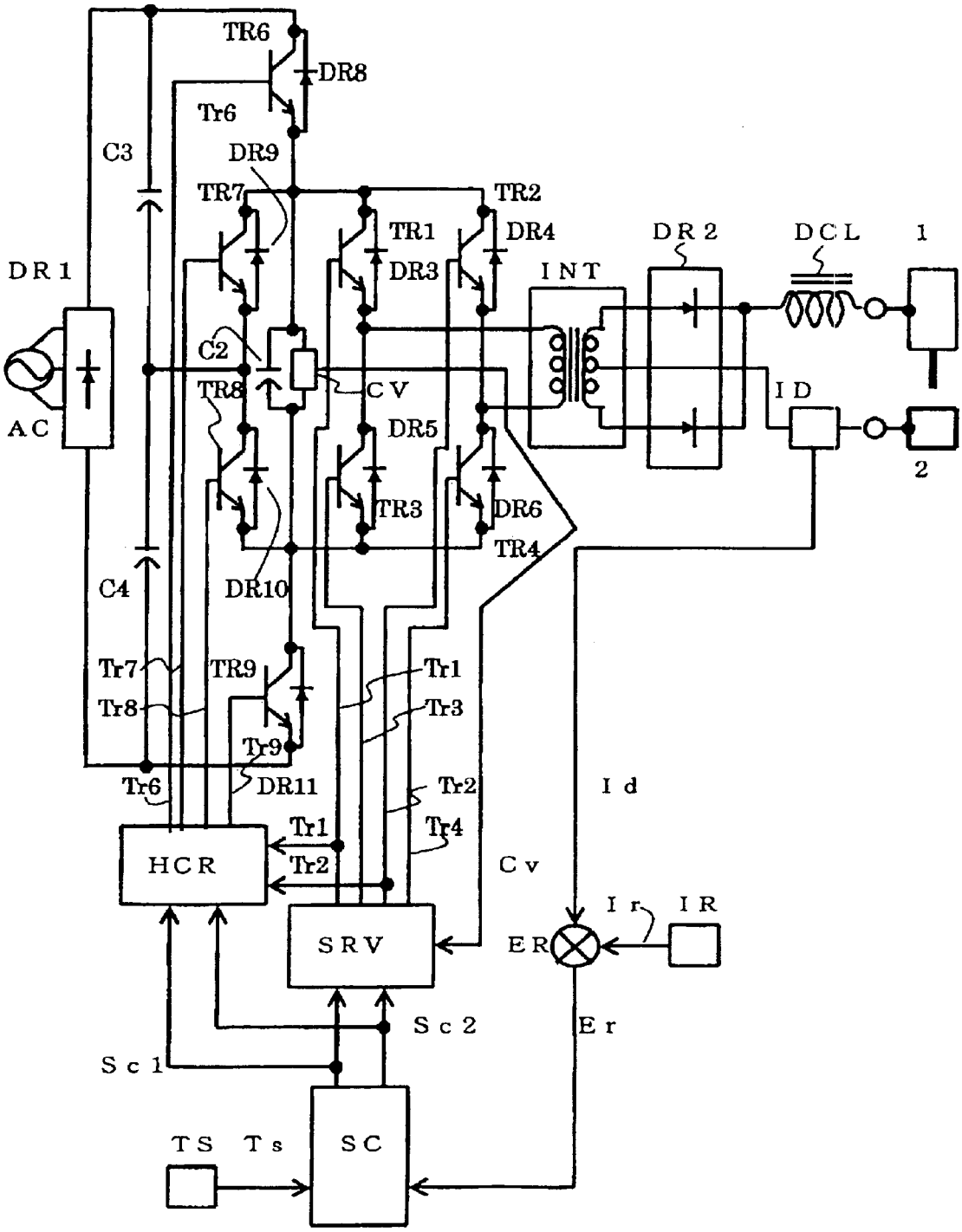
FIG. 12 is a circuit diagram showing a high-voltage arc-machining power supply according to a sixth embodiment of the present invention.

FIG. 12 is a circuit diagram showing a high-voltage arc-machining power supply according to a sixth embodiment of the present invention. In FIG. 12, components identical or similar to those of the power supply of the fourth embodiment are indicated by the same reference signs as used in FIG. 9.

The voltage detecting circuit CV is connected in parallel to the auxiliary capacitor C2. The circuit CV detects the voltage across the capacitor C2 (i.e., the voltage discharged from the capacitor C2) and outputs the voltage detection signal Cv. The switching element driver SRV performs the same functions as those of the switching element driver of the third embodiment.

The workings of the sixth embodiment will be described with reference to the timing chart shown in FIG. 10. At t=t1, the first output control signal Sc1 is inputted to the inverter driver SRV. Upon receiving the signal Sc1, the inverter driver SRV outputs the driving signals Tr1, Tr4 to change the first and the fourth switching elements TR1, TR4 to the on-state from the off-state.

At t=t7, the output control signal Sc1 is turned off, and the switching element setup time circuit TV1 begins to operate to output a switching element setup signal Ta. The voltage comparator CP compares the voltage detection signal Cv with the reference voltage setup signal Vr (zero voltage) determined by the reference voltage setup circuit VR. If the voltage detection signal Cv is smaller than the reference voltage setup signal Vr, the voltage comparison signal Cp is turned off, which terminates the output of the setup signal Ta.

Figure 13:
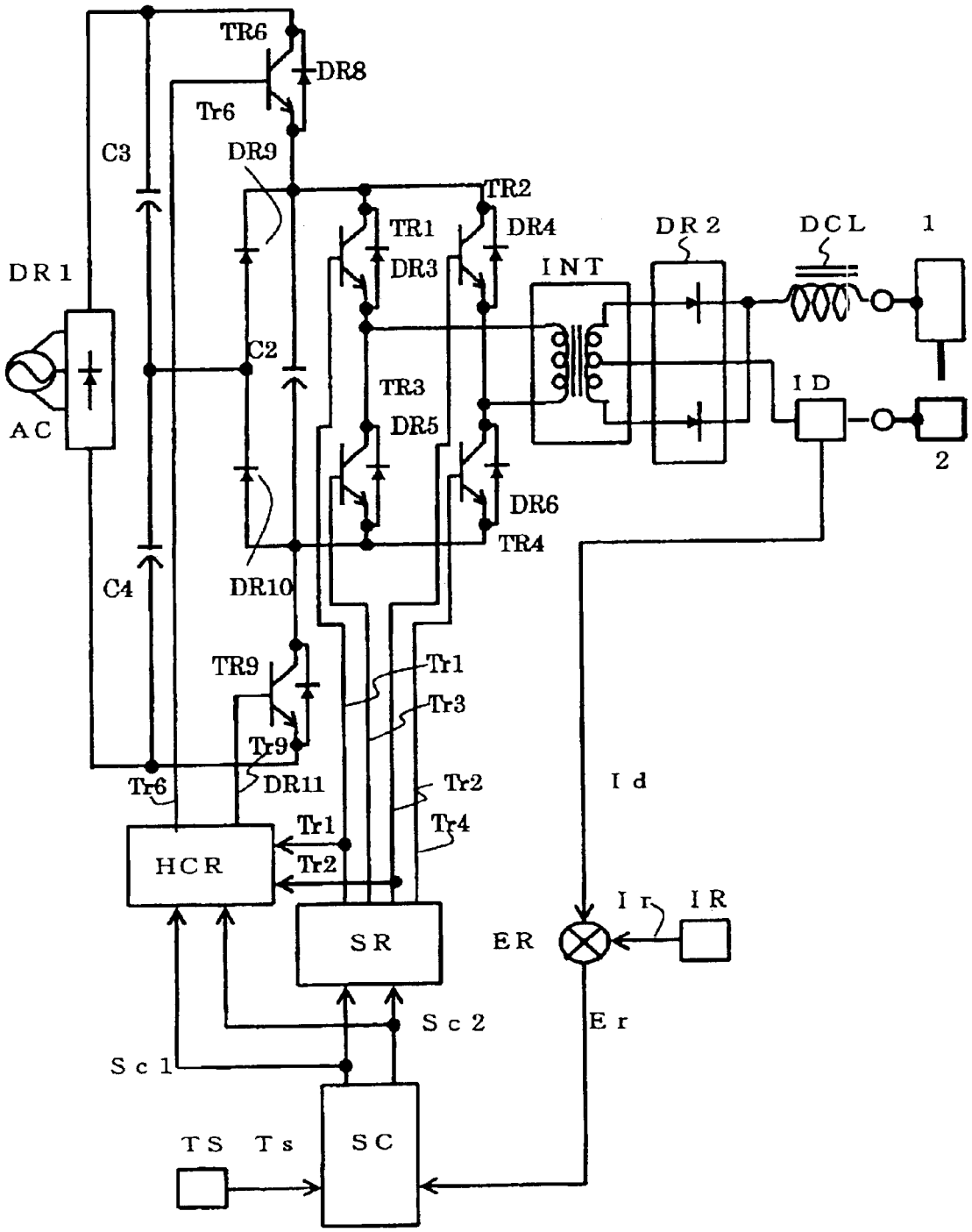
FIG. 13 is a circuit diagram showing a high-voltage arc-machining power supply according to a seventh embodiment of the present invention.

FIG. 13 is a circuit diagram showing a high-voltage arc-machining power supply according to a seventh embodiment of the present invention. In FIG. 13, components identical or similar to those of the power supply of the fourth embodiment are indicated by the same reference signs as used in FIG. 9.

The high-voltage power supply of the seventh embodiment is basically the same to that of the fourth embodiment (FIG. 9) except that the surge-evading switching elements TR7 and TR8 of the fourth embodiment are omitted.

In the power supply shown in FIG. 13, the capacitance of the auxiliary capacitor C2 is chosen so that all the electromotive force caused by the energy of the leakage inductance of the transformer INT is used to charge the auxiliary capacitor 2, and also that the voltage across the auxiliary capacitor 2 is not greater than the rating voltages of the first~fourth switching elements TR1~TR4.

The workings of the seventh embodiment will be described with reference to the timing chart shown in FIG. 10. At t=t7, the switching element TR6 is turned off, to terminate the supply of power from the smoothing capacitor C3 to the inverter circuit. The turning-off of the switching element TR6 is performed when the smoothing capacitor C3 and the auxiliary capacitor C2 are equally charged. Under this condition, the voltage across the switching element TR6 is zero, and therefore the turn-off loss can be zero.

At t=t2, the first and the fourth driving signals Tr1 and Tr4 are turned off, to turn off the first and the fourth switching elements TR1 and TR4. At this stage, the voltage charged in the auxiliary capacitor C2 has already been zero. Thus, the turn-off loss at the elements TR1 and TR4 is zero. During the On-period T3, some saturation loss occurs at the elements TR1, TR4.

At t=t2, the first and the fourth switching elements TR1, TR4 are turned off. At this stage, electromotive force is generated due to the energy of the leakage inductance of the transformer INT and to the auxiliary capacitor C2, and the capacitor C2 begins to be charged. According to the seventh embodiment, as noted above, the charge to be stored in the capacitor C2 does not exceed the rating voltage of the first~fourth elements TR1~TR4 by suitable adjustment of the capacitance of the capacitor C2.

According to the seventh embodiment, the capacitance of the capacitor C2 is optimized, which contributes to the omission of the surge-evading switching elements TR7, TR8 shown in FIG. 9.

As seen from the above description, the arc-machining power supply of the present invention includes a DC circuit and an inverter circuit, where the former converts AC voltage of the commercial power source into DC voltage, and the latter receives the converted DC voltage from the DC circuit. Between the DC circuit and the inverter circuit, there is a power on/off switching device for controlling the power supply from the DC circuit to the inverter circuit.

The inverter circuit comprises two switch pairs (each pair consisting of two transistors) connected by bridge coupling, where one switch pair and the other are alternately turned on and off. According to the present invention, the power on/off switching device is turned off to terminate the supply of DC voltage to the inverter circuit from the DC circuit before any one of the switch pairs are changed from the on-state to the off-state. In this manners a turn-off loss at the switch pairs can be substantially zero. With the minimized turn-off loss, the operation frequency of the inverter circuit can be much higher than is conventionally possible, which enables the downsizing of the cooling system for the inverter's switch pairs and the downsizing of the main transformer.

With the incorporation of the power on/off switch between the DC circuit and the inverter circuit, the arc-machining power supply of the present invention may incur an additional saturation loss caused by the power on/off switch. It should be noted, however, that the additional saturation loss is a mere trifle in the presence of the significant reduction in the turn-off loss at the switch pairs of the inverter circuit.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

We claim:

1. An arc-machining power supply comprising:

a DC circuit that outputs DC voltage;

an inverter circuit that includes a pair of first and fourth switching elements and another pair of second and third switching elements, the first to the fourth switching elements being connected to form a bridge circuit for converting the DC voltage to high-frequency AC voltage;

a transformer that converts the high-frequency AC voltage to a voltage suitable for a desired arc-machining process;

a rectifier circuit that rectifies the voltage converted by the transformer for output of DC voltage;

a power on/off device arranged between the DC circuit and the inverter circuit for controlling an output from the DC circuit to the inverter circuit;

an auxiliary capacitor for turning on the power on/off device when input voltage to the power on/off device is substantially equal to output voltage from the power on/off device;

an output control circuit that supplies first and second output control signals for performing required feedback control, the first output control signal being offset from the second output control signal by half a cycle;

a power on/off driver that turns on the power on/off device when the first output control signal changes to a high level, and turns off the power on/off device when the first output control signal changes to a low level; and an inverter driver that turns on the first and the fourth switching elements when the first output control signal changes to the high level, and turns off the first and the fourth switching elements when the first output control signal changes to the low level and a predetermined capacitor discharge period elapses, the inverter driver being also arranged to turn on the second and the third switching elements when the second output control signal changes to a high level, and turn off the second and the third switching elements when the second output control signal changes to a low level and a predetermined capacitor discharge period elapses.

2. The power supply according to claim 1, wherein the power on/off driver further turns on the power on/off device when the second output control signal changes to a high level, and also turns off the power on/off device when the second output control signal changes to a low level.

3. The power supply according to claim 1, further comprising a smoothing circuit that includes first and second smoothing capacitors of a same capacitance which are connected in series, the smoothing circuit being connected in parallel to the DC circuit, wherein the power on/off device includes a first power on/off switch and a second power on/off switch, the first power on/off switch being arranged between a plus side of the DC circuit and a plus side of the inverter circuit for controlling the output of the DC circuit, the second power on/off switch being arranged between a minus side of the DC circuit and a minus side of the inverter circuit for controlling the output of the DC circuit.

4. The power supply according to claim 3, further comprising two diodes, wherein one of the two diodes is arranged between a middle point of the smoothing circuit and an emitter side of the first power on/off switch, the other of the two diodes being arranged between the middle point of the smoothing circuit and a collector side of the second power on/off switch.

5. The power supply according to claim 3, further comprising first and second surge return switches, wherein the first surge return switch is arranged between a middle point of the smoothing circuit and an emitter side of the first power on/off switch for conducting a surge voltage to the smoothing circuit, the surge voltage occurring when the first and the fourth switching elements are turned off, and wherein the second surge return switch is arranged between the middle point of the smoothing circuit and a collector side of the second power on/off switch for conducting another surge voltage to the smoothing circuit, said another surge voltage occurring when the second and the third switching elements are turned off.

6. The power supply according to claim 3, wherein the power on/off driver turns on the first power on/off switch when the first output control signal changes to a high level, while also turning on the second power on/off switch when the second output control signal changes to a high level, and wherein the power on/off driver turns off the first power on/off switch when the first output control signal changes to a low level, while also turning off the second power on/off switch when the second output control signal changes to a low level.

7. The power supply according to claim 5, wherein the inverter driver turns on the first surge return switch when the first output control signal changes to a low level and the capacitor discharge period elapses, the turned-on first surge return switch being turned off after a predetermined length of time, and wherein the inverter driver further turns on the second surge return switch when the second output control signal changes to a low level and the capacitor discharge period elapses, the turned-on second surge return switch being turned off after a predetermined length of time.

8. The power supply according to claim 1, wherein the capacitor discharge period has a start point and an end point, the start point being defined as a point of time when either of the first and the second output control signals changes to a low level, the end point being defined as a point of time when an output discharge from the auxiliary capacitor becomes smaller than a predetermined threshold.

*9. A power supply comprising:*

*a DC circuit that outputs DC voltage;*

*an inverter circuit that includes a pair of first and fourth switching elements and another pair of second and third switching elements, the first to the fourth switching elements being connected to form a bridge circuit for converting the DC voltage to high-frequency AC voltage;*

*a power output circuit for converting the AC voltage from the inverter circuit into an output power;*

*a power on/off device arranged between the DC circuit and the inverter circuit for controlling an output from the DC circuit to the inverter circuit;*

*an auxiliary capacitor for turning on the power on/off device when input voltage to the power on/off device is substantially equal to output voltage from the power on/off device;*

*an output control circuit that supplies first and second output control signals for performing required feedback control, the first output control signal being offset from the second output control signal by half a cycle;*

*a power on/off driver that turns on the power on/off device when the first output control signal changes to a high level, and turns off the power on/off device when the first output control signal changes to a low level; and*

*an inverter, driver that turns on the first and the fourth switching elements when the first output control signal changes to the high level, and turns off the first and the fourth switching elements when the first output control signal changes to the low level and a predetermined capacitor discharge period elapses, the inverter driver being also arranged to turn on the second and the third switching elements when the second output control signal changes to a high level, and turn off the second and the third switching elements when the second output control signal changes to a low level and a predetermined capacitor discharge period elapses.*

* * * * *